United States Patent
Katoh et al.

(10) Patent No.: US 7,051,571 B2
(45) Date of Patent: May 30, 2006

(54) IMPACT-RESISTANT APPARATUS

(75) Inventors: Katsutoshi Katoh, Tokyo (JP);
Hiroyuki Noguchi, Fujisawa (JP);
Tadanori Saitoh, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 11/002,373

(22) Filed: Dec. 2, 2004

(65) Prior Publication Data

US 2005/0115304 A1      Jun. 2, 2005

(30) Foreign Application Priority Data

Dec. 2, 2003   (JP) .............................. 2003-402542

(51) Int. Cl.
*G01M 7/00*   (2006.01)
*G01N 3/32*   (2006.01)
*G01N 3/30*   (2006.01)
*G01P 15/00*   (2006.01)

(52) U.S. Cl. ..................................................... 73/12.01
(58) Field of Classification Search ..................... None
See application file for complete search history.

(56) References Cited

U.S. PATENT DOCUMENTS 6,212,026 B1 *   4/2001   Ohmi et al. .................. 360/60
6,593,855 B1 *   7/2003   Fujino et al. ............... 340/683
6,744,577 B1 *   6/2004   Guo et al. .................... 360/31

FOREIGN PATENT DOCUMENTS

JP            11-045499            2/1999

* cited by examiner

*Primary Examiner*—Max Noori
*Assistant Examiner*—Octavia Davis
(74) *Attorney, Agent, or Firm*—Jeanine S. Ray-Yarletts; Daniel E. McConnell

(57) ABSTRACT

An impact resistant portable personal computer apparatus having feet which support the personal computer, a protruding member protruding downwardly from a foot, an impact sensor in the personal computer and responsive to an impact on the member for providing an output, and an element responsive to the output for aborting an operation of the personal computer. The apparatus is responsive to a fall in which the personal computer pivots about the back feet and impact is transmitted through the front feet.

1 Claim, 6 Drawing Sheets

(a)

(b)

IMPACT-RESISTANT APPARATUS

BACKGROUND OF THE INVENTION

1. Field of the Invention

The present invention relates to an impact-resistant apparatus, such as a portable computer, enabled to abort a predetermined operation based on an output from an impact sensor.

2. Background

In a hard disk drive, data is read and written generally in such a manner that a read/write head, fixed on a tip of an access arm, is positioned at each track on a rotating disk by moving the access arm. Accordingly, when an impact is applied to the hard disk drive while writing data, the head may hit the disk or deviate from a target track, resulting in the possibility of data damage or data loss.

Therefore, methods and apparatus have been developed to combat this problem. In certain known hard disk drives for notebook-type personal computers (hereinafter, referred to as a "notebook PC"), data is prevented from being damaged or lost by providing an impact sensor inside the hard disk drive or on the main body of the notebook PC. When an impact with at least a predetermined magnitude is detected, writing on the disk is immediately aborted, or alternatively, the head is withdrawn after writing is aborted. Writing is continued after the impact subsides; see, for example, Japanese Unexamined Patent Publication No. Hei 11-45499

However, it has been revealed that, according to such a conventional technology, high impact resistance is demonstrated when a device falls from a high position, whereas the impact resistance is not as effective when the device falls from a relatively low position at a height of around 20 to 30 mm. Specifically, when a device falls from a high position (a height of around 100 mm), data is not damaged because a write operation is aborted beforehand based on an output from an impact sensor. However, in a device in which data damage or the like is caused due to a fall from a low position, it has been found that an off-track write occurs due to the vibration of a head caused by an impact during a write operation. The off-track write is an event of writing on an adjacent track.

SUMMARY OF THE INVENTION

In this connection, an object of the present invention is to provide a technology which, in a device having an impact sensor, allows a write operation to be aborted based on an output from an impact sensor to work effectively against a fall even from a relatively low position.

In order to achieve this object, an impact-resistant apparatus of one aspect of the present invention includes: an impact sensor for sensing an impact to the apparatus; means for aborting a predetermined operation based on an output from the impact sensor; a support member on a body of the apparatus for supporting, on a surface, the apparatus to be put thereon; and a protruding member protruding downward from a plane in contact with a lower end of the support member, wherein the protruding member is provided at a position where an impact from the protruding member caused by a fall of the apparatus is transmitted to the impact sensor so that the predetermined operation is aborted effectively.

An impact-resistant apparatus of another aspect of the present invention comprises: support members for supporting, on a surface, the apparatus to be put thereon; an impact sensor for sensing an impact; and means for aborting a predetermined operation based on an output from the impact sensor; and a protruding member protruding downward from a plane in contact with lower ends of the respective support members, wherein the protruding member is provided at a position where, before an impact from any of the support members affects the predetermined operation when the apparatus falls, an impact from the protruding member is transmitted to the impact sensor so that the predetermined operation is aborted.

Here, the impact-resistant apparatus includes, for example, a notebook PC and a DVD recorder with a built-in hard disk. The impact sensors include, for example, those which detect an impact applied to the apparatus, as a change in acceleration. The predetermined operations include, for example, a write operation on a hard disk drive and a write operation on a DVD. The protruding members include, for example, those constituted of an elastic member such as rubber, and hard types are preferable because they excellently transmit an impact. For the amount of downward protrusion from the plane in contact with the lower ends of the support members, preferable are, for example, around 0.2 to 0.3 mm.

As for the structure, in the case of a conventional one, when the apparatus is put on the surface but is erroneously dropped, any of the support members hits the surface. Therefore, the conventional one is designed such that an impact is transmitted from the support members to the impact sensor to abort the predetermined operation. Accordingly, in the case of a fall from a relatively low position, since the apparatus hits the surface at the point when the falling speed is relatively small, an impact may be transmitted to a functional part for performing the predetermined operation before the impact is transmitted to the impact sensor, depending on the positional relationship among the impact sensor, the functional part and the support members. Consequently, the predetermined operation might be falsely performed without being aborted. However, according to the present invention, the structure is made such that the protruding member, which protrudes downward from the plane in contact with the lower ends of the support members, is provided at the position where, before an impact from any of the support members affects the predetermined operation when the apparatus falls, an impact from the protruding member is transmitted to the impact sensor so that the predetermined operation is aborted. In other words, the protruding member is provided at a position where an impact from the protruding member caused by a fall of the apparatus is transmitted to the impact sensor so that an impact from the support member has no effect on the predetermined operation. Accordingly, it is possible to allow the processing of aborting a predetermined operation based on an output from the impact sensor to work effectively, and thus to prevent a false operation.

In a preferred aspect of the present invention, the protruding member is provided at a position where, when the apparatus falls, the impact from the protruding member is transmitted to the impact sensor earlier than any of impacts transmitted from the support members.

In another preferred aspect of the present invention, the protruding member is provided in the vicinity of the impact sensor.

Moreover, the predetermined operation is a write operation on a hard disk drive, and the impact sensor is provided on a printed circuit board in the hard disk drive. In this case, if the apparatus includes an attachment member for supporting the hard disk drive and attaching it to the apparatus, it is preferable that the protruding member be provided on the attachment member and in the vicinity of the impact sensor.

Further, when the apparatus is a portable personal computer, the support members are four rubber feet respectively provided in the vicinity of four corners of the back face of the personal computer, and the hard disk drive is provided at the front side of the personal computer. In this case, the fall of the apparatus is a fall in which, while two of the rubber feet at the rear side of the personal computer are in contact with the surface, the front side of the personal computer falls as if the personal computer rotates around an axis made of those contact points.

Furthermore, the protruding member is constituted of an elastic member. In other words, the protruding member is made of an elastic body. In a state where the apparatus is put on the surface, the protruding member elastically contracts by being pressed against the surface, and the apparatus is supported only by the support members.

According to the present invention, even if an apparatus falls from a relatively low position, a predetermined operation which might be affected by an impact due to the fall can be aborted based on an output from an impact sensor, before the operation is performed.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF EMBODIMENTS OF THE PRESENT INVENTION

Figure 1:
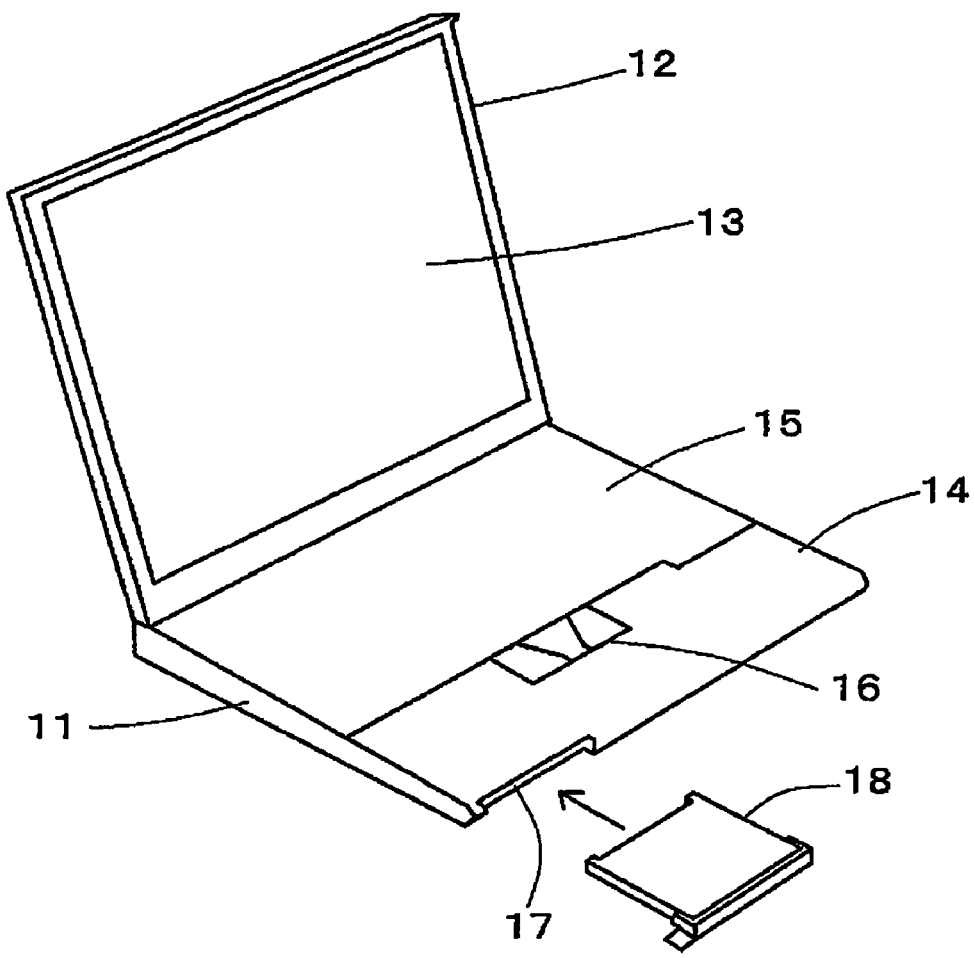
FIG. 1 is a perspective view showing a notebook PC according to an embodiment of the present invention.

FIG. 1 is a perspective view showing a notebook PC according to an embodiment of the present invention. As shown in this drawing, the notebook PC includes a main body 11 and a cover part 12 attached to the main body 11 through a hinge (not shown) so as to be capable of opening and closing. A liquid crystal display 13, or other appropriate type of display, which has a display screen on a side facing the main body 11 when the cover part 12 is closed, is incorporated in the cover part 12. A keyboard bezel 14 is provided on an upper portion of the main body 11. A keyboard 15, a trackpoint button or other auxiliary user input device 16 and the like are incorporated in the keyboard bezel 14. A housing portion 17 for housing a hard disk drive is provided, for example, in the left side of the front face of the main body 11. A hard disk drive 18 is inserted into the housing portion 17 in the arrow direction in FIG. 1 and housed therein.

Figure 2:
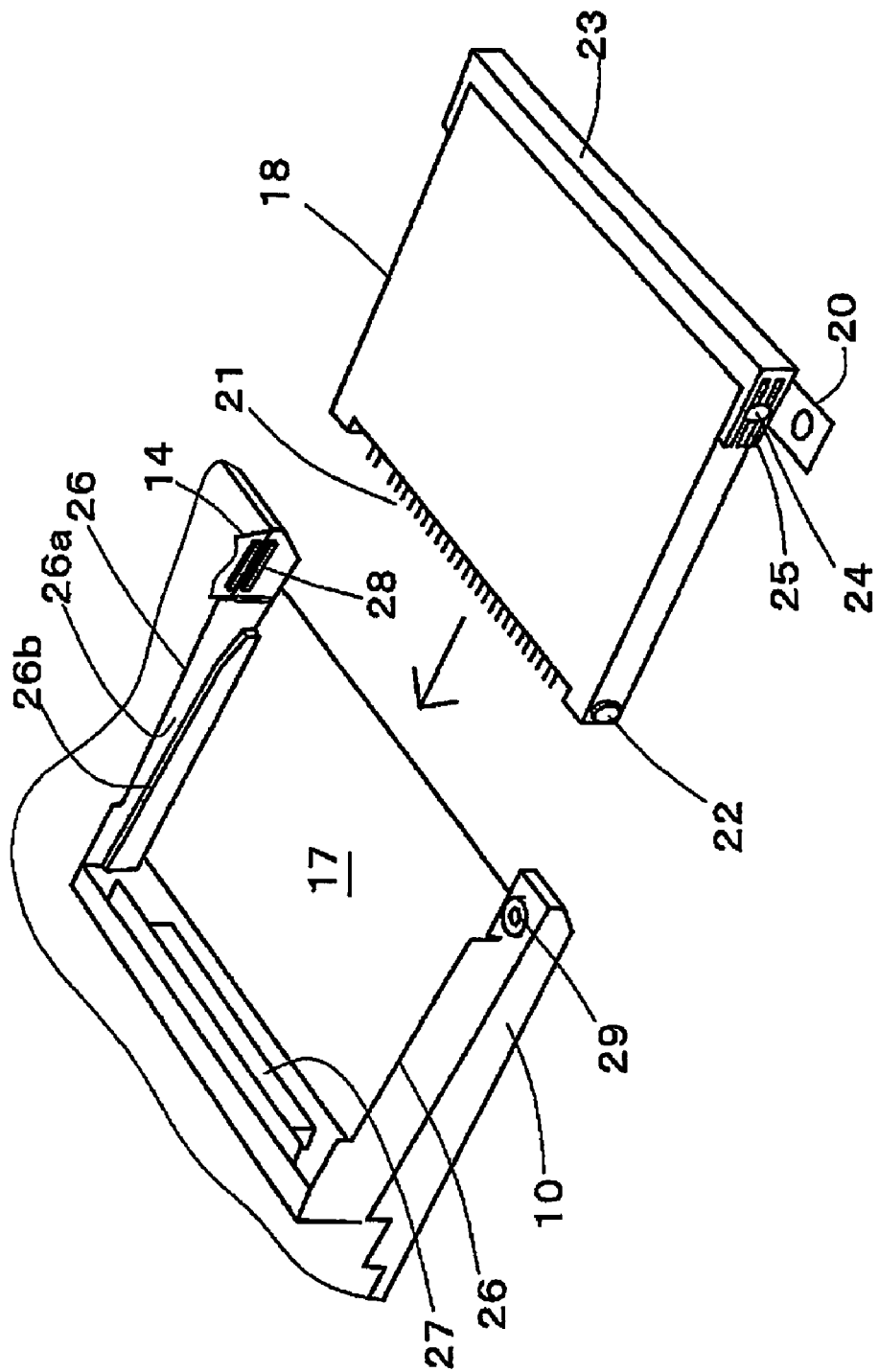
FIG. 2 is a perspective view showing an enlarged hard disk drive and an enlarged housing portion in a lower portion of a main body of the notebook PC in FIG. 1 in a state where a keyboard bezel is removed therefrom.

FIG. 2 shows the an enlarged view of the hard disk drive 18 and housing portion 17 in a lower portion of the main body 11 in a state where the keyboard bezel 14 has been removed. The hard disk drive 18 has a HDD-side connector 21 having a large number of connector pins for electrical connection to the main body 11, and screws 22 respectively attached to both sides of the hard disk drive 18 at the connector 21 side. A HDD bezel 23 is attached to the hard disk drive 18 at the opposite side from the connector 21.

The HDD bezel 23 is rotatably attached, at both sides, to the hard disk drive 18 with screws 24. Two positioning grooves 25 for guiding and positioning the hard disk drive 18 when it is housed in the housing portion 17, are provided for each of both sides of the HDD bezel 23. A screwed portion 20, in which a hole is formed to fix the hard disk drive 18 by fastening a screw when the hard disk drive 18 is housed in the housing portion 17, is provided on the left end of the HDD bezel 23.

Main part of the housing portion 17 is formed on a base cover 10 constituting the lower portion of the main body 11. Guide members 26 for guiding the hard disk drive 18 to be inserted into the housing portion 17 when the hard disk drive 18 is housed, are provided on both sides of the housing portion 17. Each of the guide members 26 has a guide face 26a and a guide rail 26b. When the hard disk drive 18 is inserted, the guide faces 26a guide the heads of the screws 22 so as to position them in a right-left direction while the guide rails 26b guide the heads so as to position them in an up-down direction. A main body-side connector 27 to be connected to the HDD-side connector 21 is provided at the far end of the housing portion 17 in order to electrically connect the hard disk drive 18.

Two positioning rails 28 for guiding and positioning the HDD bezel 23 in cooperation with the positioning grooves 25, are provided for each of both sides of the housing portion 17 at the inlet side. Note that the lower positioning rails 28 are disposed on the base cover 10 while the upper positioning rails 28 are disposed on the keyboard bezel 14 on the upper portion of the main body 11. A screw hole 29 for fixing the screwed portion 20 to the base cover 10 by fastening a screw, is provided on the left of the inlet of the housing portion 17.

When the hard disk drive 18 is housed in the housing portion 17, the hard disk drive 18 is inserted into the housing portion 17 in the arrow direction in FIG. 2 while the heads of the screws 22 are being guided by the guide members 26. When the HDD-side connector 21 reaches the vicinity of the main body-side connector 27, the positioning grooves 25 come to fit to the positioning rails 28. The HDD-side connector 21 is fitted into the main body-side connector 27 by further pressing the HDD bezel 23 in the inserting direction, and thus the insertion is completed. At this time, the screwed portion 20 is positioned under the screw hole 29. Therefore, an adequate screw is screwed into the screw hole 29 from underneath through the hole in the screwed portion 20, whereby the HDD bezel 23 is fixed to the base cover 10. Thus, the housing of the hard disk drive 18 is completed.

In this housed state, the hard disk drive 18 is supported on the guide members 26 through the screws 22 and supported by the HDD bezel 23 only through the screws 24. That is, the hard disk drive 18 is supported only through the screws 22 and 24 on four corners except that the connector 21 is fitted in the main body-side connector 27.

Figure 3:
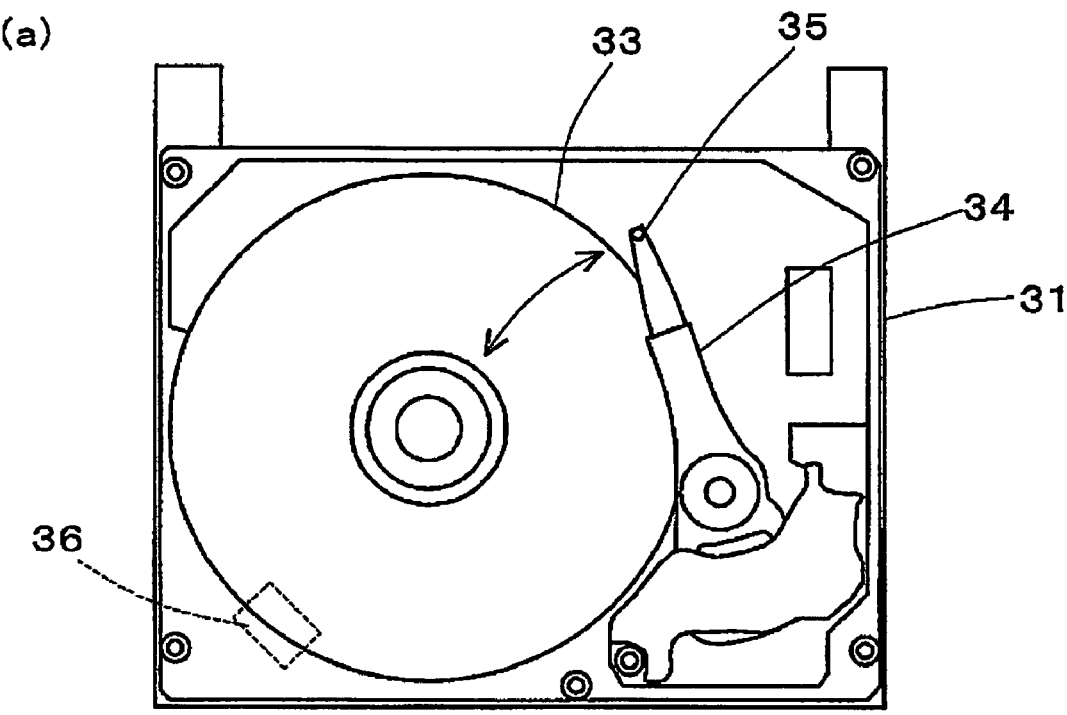
FIGS. 3(a) and 3(b) are plan views showing a positional relationship between an impact sensor and a magnetic head of the hard disk drive in the notebook PC in FIG. 1.
Figure 3:
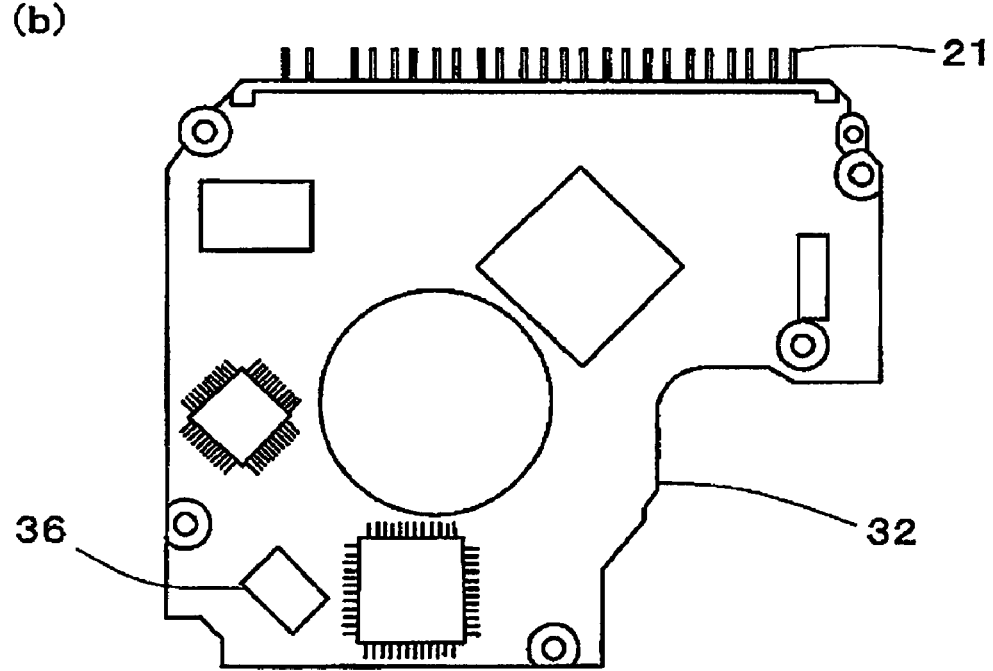

FIGS. 3(*a*) and 3(*b*) show a positional relationship between a magnetic head and an impact sensor in the hard disk drive 18. FIG. 3(*a*) shows a main body 31 of the hard disk drive 18, and FIG. 3(*b*) shows a printed circuit board 32. A disk 33 and an access arm 34 for performing seek operation are provided on the main body 31. A magnetic head 35 for reading/writing on the disk 33 is fixed to a tip of the access arm 34. In a seek operation, the magnetic head 35 is moved in the arrow directions in FIG. 3(*a*) by the access arm 34.

On the printed circuit board 32, an impact sensor 36 for sensing an impact as an acceleration is provided in addition to a read/write circuit for reading/writing data through the magnetic sensor 35, a control circuit, a microprocessor, and the like. The printed circuit board 32 is designed such that a write operation can be aborted based on an output from the impact sensor 36. Assuming that FIGS. 3(*a*) and 3(*b*) are diagrams viewed from above, the printed circuit board 32 is placed under the main body 31 while the positional relationship in the drawings are maintained without being rotated. In this state, the printed circuit board 32 is fixed to the main body 31. Accordingly, the position of the impact sensor 36 is considerably far from the magnetic head 35. The reason why the magnetic head 35 is placed in such a position is that there is a spatial constraint on the placement position relative to the other elements and circuits. Note that the hard disk drive 18 is housed in the housing portion 17 in such an orientation that the main body 31 is positioned at the lower side and the printed circuit board 32 is positioned at the upper side.

Figure 4:
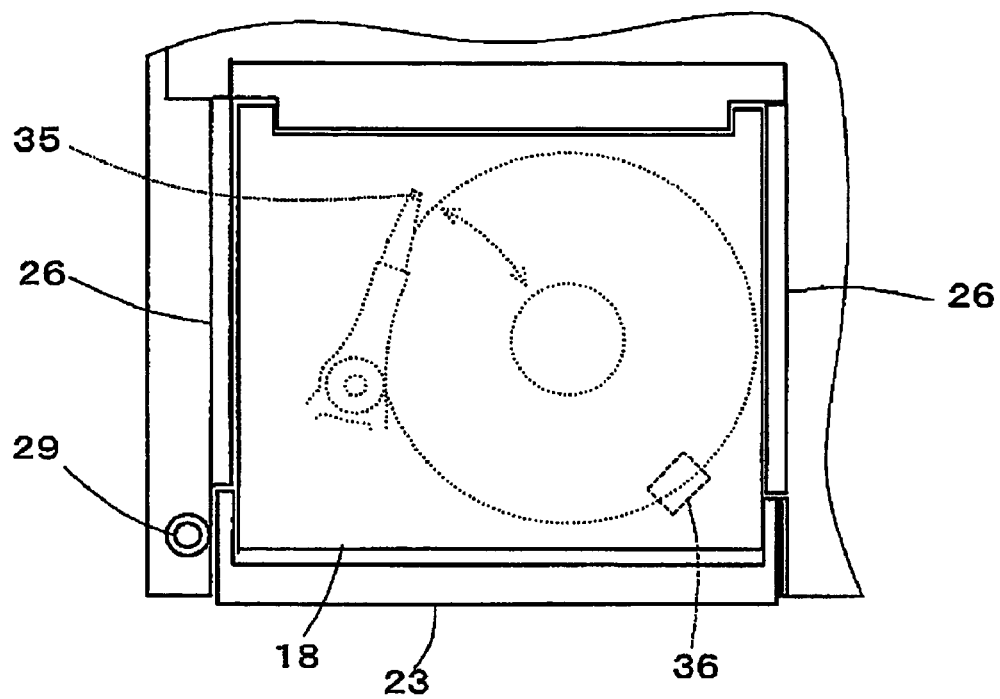
FIG. 4 is a view showing a positional relationship between the impact sensor and the magnetic head, in a state where the hard disk drive in the notebook PC in FIG. 1 is housed.

FIG. 4 shows a positional relationship between the magnetic head 35 and the impact sensor 36, in a state where the hard disk drive 18 is housed in the housing portion 17. This drawing shows a state of the notebook PC viewed from above, with the keyboard bezel 14 removed therefrom. In comparison with FIG. 3, the left and right positions are reversed in this drawing because FIG. 3 corresponds to a state of the notebook PC viewed from below.

Figure 6:
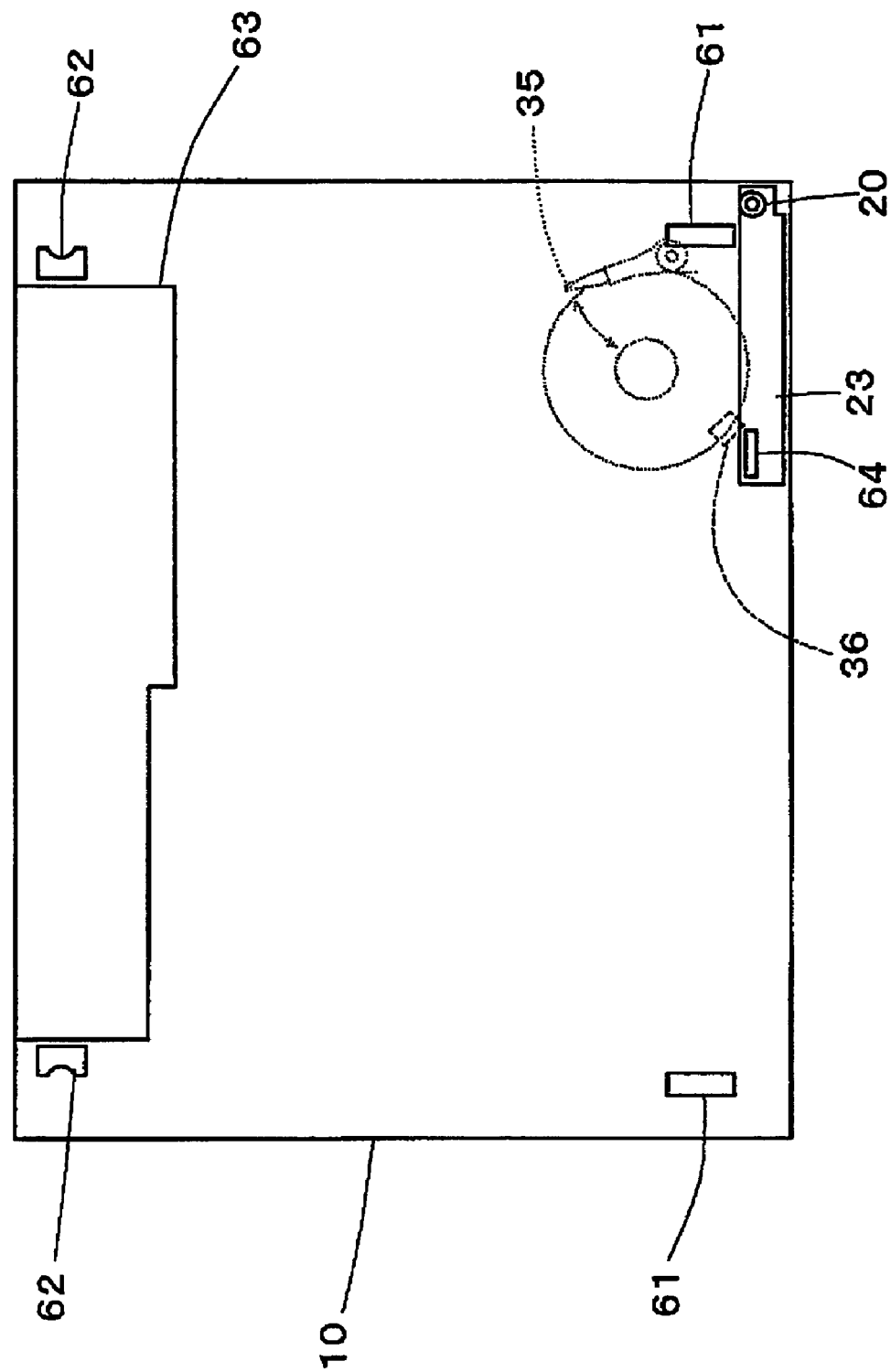
FIG. 6 is a view showing a state of the notebook PC in FIG. 1 viewed from the back face.

FIG. 6 shows a state of the notebook PC viewed from the back face thereof.

On the base cover 10, rubber feet 61 are provided in the vicinity of both ends at the front side, and rubber feet 62 are provided in the vicinity of both ends at the rear side. The rear side is heavier because a battery pack 63 is attached to the rear side. On the HDD bezel 23, a rubber foot 64 is provided so as to be positioned in the vicinity of the impact sensor 36. The rubber foot 64 has a height that allows the rubber foot 64 to protrude 0.3 mm from a surface when the notebook PC is put thereon by means of the rubber feet 61 and 62.

Specifically, when the notebook PC is moved along a desk top or when the direction of the notebook PC is changed, the notebook PC is often placed in the following manner. First, the rubber feet 62 at the rear side are put on the desk top, and thereafter, the front rubber feet 61 are put on the desk top. In such a case, there are some occasions when the notebook PC accidentally slips out of hands holding the front side of the notebook PC, with only the rubber feet 62 on the desk top, and consequently the front side of the notebook PC hits the desk top. The rubber foot 64 on the HDD bezel 23 is designed to hit the desk top earlier than the rubber feet 61 do on such an occasion.

When the magnetic head 35 and the impact sensor 36 have the aforementioned positional relationship as shown in FIG. 4, high impact resistance is demonstrated according to a conventional structure in the case of a fall from a high position. However, it has been found that the impact resistance is lowered when the front side of the notebook PC, i.e., the side where the hard disk drive 18 is housed falls from a relatively low position at a height of around 20 to 30 mm. In other words, when the notebook PC falls from a high position (a height of around 100 mm), data is not damaged because a write operation is aborted beforehand based on an output from the impact sensor. However, in a device in which data damage or the like is caused due to a fall from a low position, it has been found that an off-track write, which is an event of writing on an adjacent track, occurs due to the vibration of the head caused by an impact during a write operation.

Figure 7:
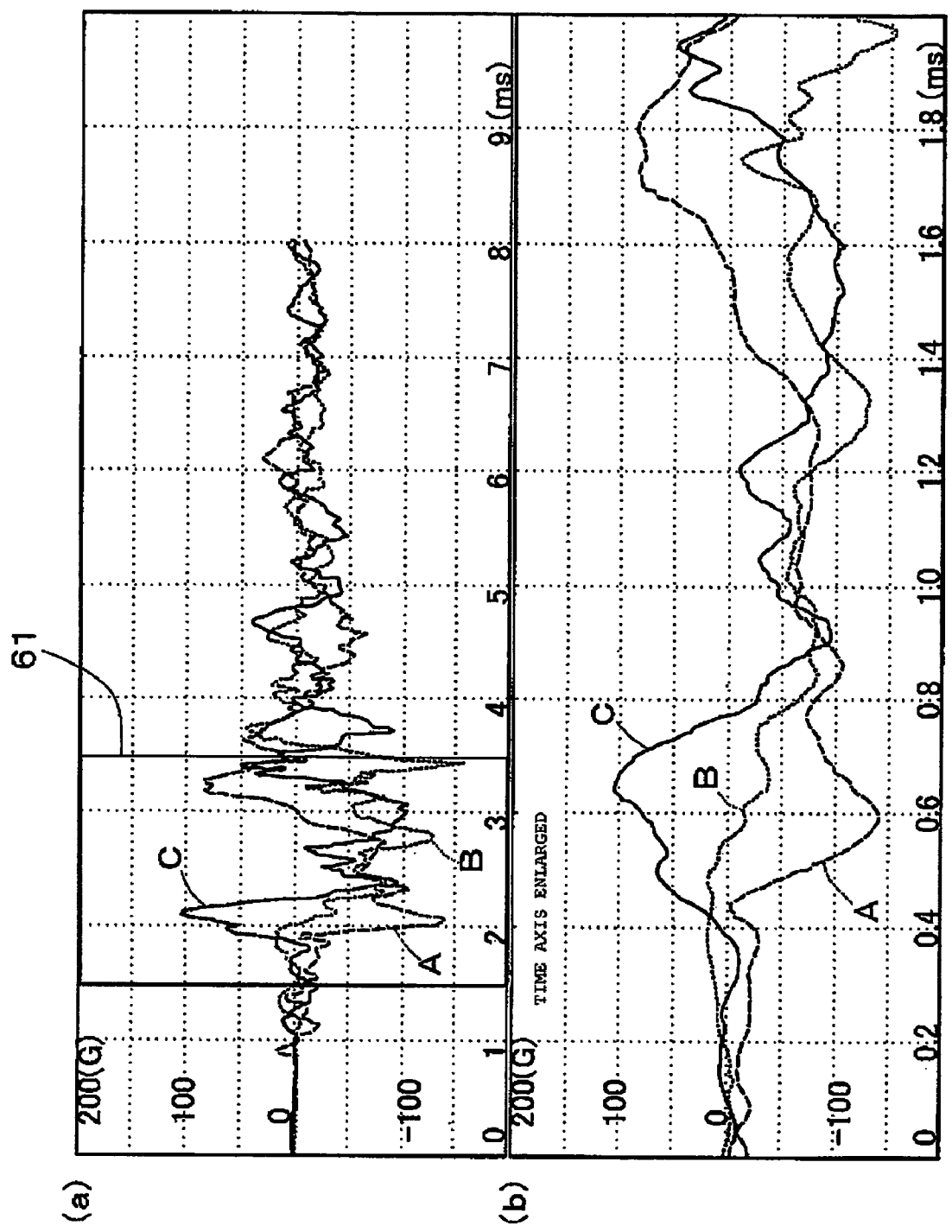
FIGS. 7(a) and 7(b) are graphs showing a cause of the occurrence of an off-track write in the positional relationship between the impact sensor and the magnetic head shown in FIG. 4.

FIGS. 7(*a*) and 7(*b*) are graphs showing a cause of the occurrence of an off-track write. These graphs have been obtained as follows. Impact sensors were respectively attached to positions A, B and C shown in FIG. 5 on the back face of the hard disk drive 18 (on the notebook PC's back face side in a state of being housed in the notebook PC). In this state, while the rear end of the notebook PC was kept on a surface, the front side thereof was raised around 20 to 30 mm and then dropped. The impacts were measured with each of the sensors. Curves A, B and C in FIGS. 7(*a*) and 7(*b*) show changes over time in the accelerations measured with the impact sensors at the positions A, B and C in FIG. 5, respectively. Note that FIG. 7(*b*) is a graph showing a part in a frame 61 in FIG. 7(*a*) with the time axis enlarged.

Figure 5:
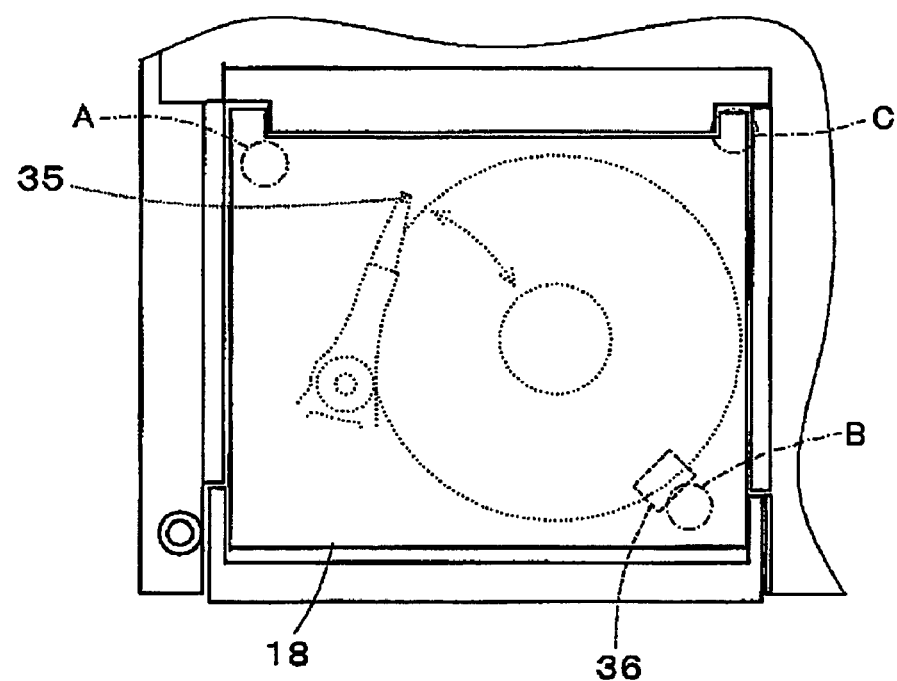
FIG. 5 is a view showing the positions of impact sensors attached to the back face of the hard disk drive in the notebook PC in FIG. 1, for experiment.

From these measurement results, it is found that, when the notebook PC is dropped from a relatively low position at a height of around 20 to 30 mm, an impact is transmitted, when seen in FIG. 5, from the left side to the right side (from the position A side to the position B side), and moreover, from the rear side to the front side (from the position C side to the position B side). That is, if the magnetic head 35 and the impact sensor 36 have the positional relationship as shown in FIG. 5, an impact is transmitted to the magnetic head 35 earlier than the impact sensor 36 when the notebook PC is dropped from a low position. Therefore, before a write operation is aborted based on the detection of an impact by the impact sensor 36, the magnetic head 35 is vibrated and moves to an adjacent track, thus causing an off-track write.

According to this embodiment, however, when the notebook PC falls from a low position, an impact transmitted from the rubber foot 64 on the HDD bezel 23 aborts a write operation through the impact sensor 36 before an impact transmitted from the rubber feet 61 vibrates the magnetic head 35 to cause an off-track write. In other words, the rubber foot 64 is provided at a position where an impact from the rubber foot 64 caused by the fall of the notebook PC is transmitted to the impact sensor 36 so that an impact from the rubber feet 61 have no effect on the write operation. Accordingly, it is possible to prevent the occurrence of an off-track write.

Note that the present invention is not limited to the foregoing embodiment and can be implemented with a suitable alteration of the embodiment. For example, the additional rubber foot 64 is disposed on the HDD bezel 23 in the foregoing embodiment. Instead, however, the additional rubber foot may be disposed on the hard disk drive 18 at the position of the impact sensor 36 and may be protruded through a hole formed at a corresponding portion on the base cover 10. In addition, at this time, the rubber foot may be fixed to the printed circuit board in the hard disk drive or to a cover of the printed circuit board.

Although the preferred embodiment of the present invention has been described in detail, it should be understood that various changes, substitutions and alternations can be made therein without departing from spirit and scope of the inventions as defined by the appended claims.

What is claimed is:

1. An impact resistance apparatus comprising:
   a portable personal computer having a hard disk drive disposed at the front side of the personal computer;
   an impact sensor disposed in said personal computer which senses an impact to said personal computer and provides an output;
   an element disposed in said personal computer and operatively coupled to said sensor, the element aborting a predetermined operation of said personal computer based upon an output from the sensor;
   four feet provided on said personal computer in the vicinity of four corners of a back face of said personal computer and supporting said personal computer;
   a protruding member protruding downward from a plane in contact with a lower end of one of said feet and disposed at a position where an impact on the protruding member caused by a fall of said personal computer is transmitted to the impact sensor so that the predetermined operation is aborted effectively;

wherein the fall of the apparatus is a fall in which, while two of the feet at a rear side of the personal computer are in contact with the surface, the front side of the personal computer falls as if the personal computer rotates around an axis made of the surface contact points of the two rear feet.

* * * * *